US010253882B2

(12) United States Patent
Sytsma et al.

(10) Patent No.: US 10,253,882 B2
(45) Date of Patent: Apr. 9, 2019

(54) OIL CONTROL RING ASSEMBLY

(71) Applicant: Mahle International GmbH, Stuttgart (DE)

(72) Inventors: Steven J. Sytsma, Muskegon, MI (US); Thomas J. Smith, Muskegon, MI (US)

(73) Assignee: Mahle International GmbH (DE)

( * ) Notice: Subject to any disclaimer, the term of this patent is extended or adjusted under 35 U.S.C. 154(b) by 991 days.

(21) Appl. No.: 14/585,860

(22) Filed: Dec. 30, 2014

(65) Prior Publication Data
US 2015/0184748 A1 Jul. 2, 2015

Related U.S. Application Data

(60) Provisional application No. 61/966,709, filed on Mar. 1, 2014, provisional application No. 61/921,918, filed on Dec. 30, 2013.

(51) Int. Cl.
*F16J 9/06* (2006.01)
*F16J 9/20* (2006.01)

(52) U.S. Cl.
CPC ............... *F16J 9/06* (2013.01); *F16J 9/064* (2013.01); *F16J 9/066* (2013.01); *F16J 9/203* (2013.01); *F16J 9/068* (2013.01)

(58) Field of Classification Search
CPC .... F16J 9/064; F16J 9/066; F16J 9/067; F16J 9/068; F16J 9/203
See application file for complete search history.

(56) References Cited

U.S. PATENT DOCUMENTS

| 2,213,452 | A | 9/1940 | Paton |
| 5,605,741 | A | 2/1997 | Hite et al. |
| 6,161,837 | A | 12/2000 | Shureb |
| 7,036,823 | B2 * | 5/2006 | Takiguchi ................ F16J 9/064 |
| | | | 277/434 |

(Continued)

FOREIGN PATENT DOCUMENTS

| CN | 1846087 A | 10/2006 |
| DE | 19621721 A1 | 12/1996 |

(Continued)

OTHER PUBLICATIONS

English Abstract for DE19621721A1.

(Continued)

*Primary Examiner* — Nicholas L Foster
(74) *Attorney, Agent, or Firm* — Fishman Stewart PLLC

(57) ABSTRACT

Exemplary oil control rings and methods are disclosed. An oil control ring may include an upper lamella having a first outer radial surface and a lower lamella having a second outer radial surface. An expander ring is in communication with the upper lamella and the lower lamella and generates an expander radial outward force on the lamellas. At least one of the first outer radial surface and the second outer radial surface is comprised of a first contact section and a first tapered section. The first tapered section is configured to generate a first radially inward force greater than or equal to the expander radial outward force when moved in a first direction and a second radially inward force less than the expander radial outward force when moved in a second direction.

20 Claims, 8 Drawing Sheets

(56) References Cited

U.S. PATENT DOCUMENTS

| | | | | |
|---|---|---|---|---|
| 7,077,402 B2* | 7/2006 | Katumaru | ............... | F16J 9/061 |
| | | | | 277/434 |
| 7,117,594 B2* | 10/2006 | Preyer | ................. | F16J 9/206 |
| | | | | 277/442 |
| 7,306,232 B2 | 12/2007 | Fiedler | | |
| 7,354,045 B2* | 4/2008 | Abe | ..................... | F16J 9/062 |
| | | | | 277/435 |
| 7,396,018 B1* | 7/2008 | Fiedler | ................. | F16J 9/206 |
| | | | | 277/434 |
| 8,371,585 B2* | 2/2013 | Esser | ..................... | F16J 9/20 |
| | | | | 277/434 |
| 8,403,334 B2* | 3/2013 | Lahrman | ............... | F16J 9/064 |
| | | | | 277/434 |
| 8,820,750 B2* | 9/2014 | Chiba | ................... | F16J 9/062 |
| | | | | 277/443 |
| 9,638,321 B2* | 5/2017 | Meyer | ................... | F16J 9/203 |
| 9,784,369 B2* | 10/2017 | Fujita | ..................... | F16J 9/20 |
| 9,915,345 B2* | 3/2018 | Kawase | ................ | F16J 9/206 |
| 2002/0190476 A1* | 12/2002 | Preyer | ................. | F16J 9/206 |
| | | | | 277/444 |
| 2004/0061291 A1* | 4/2004 | Takiguchi | ............. | F16J 9/064 |
| | | | | 277/446 |
| 2006/0006604 A1* | 1/2006 | Abe | ..................... | F16J 9/062 |
| | | | | 277/434 |
| 2006/0273525 A1* | 12/2006 | Fiedler | ................. | F16J 9/066 |
| | | | | 277/434 |
| 2010/0176557 A1* | 7/2010 | Peter-Klaus | ............ | F16J 9/062 |
| | | | | 277/460 |
| 2012/0261886 A1* | 10/2012 | Chiba | ................... | F16J 9/062 |
| | | | | 277/443 |
| 2013/0049305 A1* | 2/2013 | Miyamoto | ............. | F16J 9/062 |
| | | | | 277/467 |
| 2013/0075977 A1 | 3/2013 | An | | |
| 2013/0181410 A1* | 7/2013 | Chiba | ................... | F16J 9/062 |
| | | | | 277/443 |
| 2013/0214493 A1 | 8/2013 | Cha et al. | | |
| 2014/0165826 A1* | 6/2014 | Baerenreuter | .......... | F16J 9/062 |
| | | | | 92/172 |
| 2015/0130143 A1* | 5/2015 | Meyer | ................... | F16J 9/206 |
| | | | | 277/442 |
| 2016/0076649 A1* | 3/2016 | Fukuma | ................ | F16J 9/10 |
| | | | | 277/437 |
| 2017/0175893 A1* | 6/2017 | Fujita | ................... | F16J 9/20 |
| 2017/0184198 A1* | 6/2017 | Kawase | ................. | F16J 9/206 |
| 2017/0227126 A1* | 8/2017 | Kawasaki | ............... | F16J 9/064 |
| 2018/0023702 A1* | 1/2018 | Nakamura | ............... | F02F 5/00 |
| | | | | 277/434 |
| 2018/0031127 A1* | 2/2018 | Takezawa | ................ | F02F 5/00 |
| 2018/0038483 A1* | 2/2018 | Shimizu | ................. | F16J 9/06 |
| 2018/0038484 A1* | 2/2018 | Kawase | ................ | F16J 9/206 |

FOREIGN PATENT DOCUMENTS

| | | | | |
|---|---|---|---|---|
| DE | 102004032403 | B3 | | 12/2005 |
| DE | 102004032342 | A1 | | 2/2006 |
| DE | 102012005174 | A1 | | 10/2012 |
| EP | 0764801 | A1 | | 3/1997 |
| EP | 1876345 | A1 | | 1/2008 |
| EP | 2413006 | A1 | | 2/2012 |
| FR | 2723401 | A1 | | 2/1996 |
| WO | WO-2005/024277 | A1 | | 3/2005 |
| WO | WO-2011012336 | A1 | | 2/2011 |
| WO | WO-2016017499 | A1 * | 2/2016 | ............... F02F 5/00 |

OTHER PUBLICATIONS

English Abstract for DE102004032403B3.
English Abstract for EP0764801A1.
English Abstract for WO2011012336A1.
English Abstract for DE102004032342A1.
International Search Report for PCT/US2013/078289 dated May 15, 2014.
English Abstract for FR2723401.
International Search Report for PCT/IB2014/067426, dated Jun. 12, 2015, 3 pp.
English Abstract for DE102012005174.

* cited by examiner

OIL CONTROL RING ASSEMBLY

CROSS-REFERENCE TO RELATED APPLICATIONS

The application claims priority to U.S. Provisional Application Ser. No. 61/921,918, filed on Dec. 30, 2013, and U.S. Provisional Application Ser. No. 61/966,709, filed on Mar. 1, 2014, and the contents of each are hereby expressly incorporated by reference in their entirety.

BACKGROUND

Internal combustion engine manufacturers are constantly seeking to improve the longevity and reliability of their engines. One method of improving an engine's longevity is to include oil control rings on the pistons of the internal combustion engine. Oil control rings perform the dual functions of minimizing oil consumption while simultaneously ensuring sufficient lubrication between the piston and the cylinder wall. Oil control rings are commonly designed to form a compromise between these two functions. In order to minimize oil consumption, the oil control rings ideally scrape off as much oil as possible from the cylinder wall during the down-stroke of the piston in the direction of the oil chamber. In order to ensure sufficient lubrication to minimize friction and wear, the oil control rings ideally maintain a minimal oil film between the oil control ring and the cylinder wall.

Oil control ring design must maintain the compromise between reducing oil consumption and maintaining sufficient lubrication over the life of the engine. The lifespan of an internal combustion engine may encompass years of operation. Excessive wear on the oil control ring outer radial surface may widen the gap between the oil control ring and the cylinder wall. This excessive wear can have a negative impact on the oil consumption of the engine. It is therefore, highly desirable to minimize the amount of wear the oil control ring experiences during its operational lifespan.

Oil control ring designs may utilize expander spring elements to bias ring surfaces into contact with the cylinder liner surface. The amount of force exerted on the cylinder wall may also play a role in controlling the oil film thickness. Oil control rings with larger surface areas of contact typically are effective at resisting radial wear, but may also require an undesirably large or rigid expander spring element to generate adequate biasing force. An expander spring element with a large spring rate may make installation of the oil control ring assembly difficult during assembly.

Accordingly, there is a need for an oil control ring assembly that provides an improved balance between reducing oil consumption and sufficient lubrication. There is further a need for an oil control ring that reduces wear and allows for the use of expander spring elements with reduced spring rates.

BRIEF DESCRIPTION OF THE DRAWINGS

Referring now to the drawings, illustrative examples are shown in detail. Although the drawings represent the exemplary illustrations described herein, the drawings are not necessarily to scale and certain features may be exaggerated to better illustrate and explain an innovative aspect of an exemplary illustration. Further, the exemplary illustrations described herein are not intended to be exhaustive or otherwise limiting or restricting to the precise form and configuration shown in the drawings and disclosed in the following detailed description. Exemplary illustrations of the present invention are described in detail by referring to the drawings as follows.

DETAILED DESCRIPTION

Figure 1:
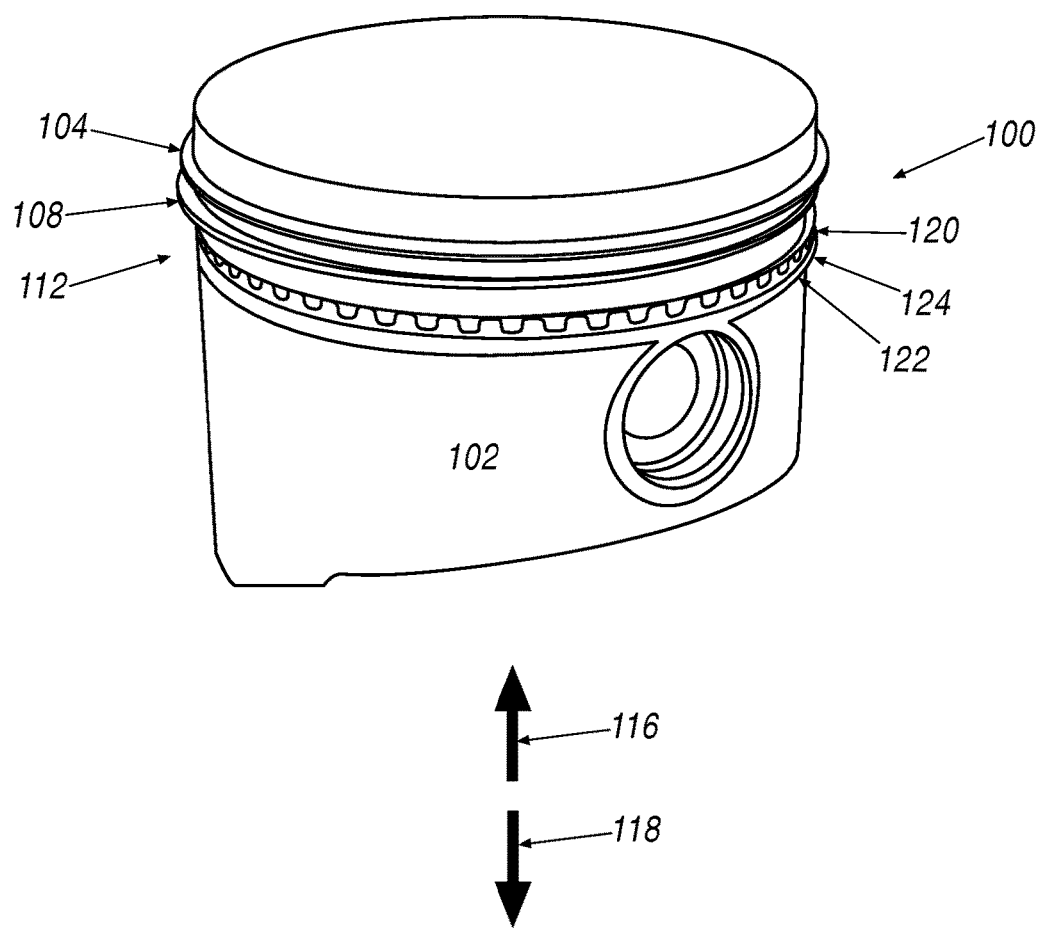
FIG. 1 is a view of an exemplary piston assembly.

Reference in the specification to "an exemplary illustration", an "example" or similar language means that a particular feature, structure, or characteristic described in connection with the exemplary approach is included in at least one illustration. The appearances of the phrase "in an illustration" or similar type language in various places in the specification are not necessarily all referring to the same illustration or example.

Various exemplary illustrations are provided herein of a piston assemblies and oil control ring assemblies providing reduced expander spring rates while also providing adequate tension between the oil control ring assembly and an associated cylinder bore. In some exemplary approaches, a piston assembly may include a piston head having first and second compression ring grooves, compression rings within the grooves, an oil control ring groove, and an oil control ring assembly. The oil control ring assembly may further include an upper lamella with a first outer radial surface that defines a first outer radial surface width. The oil control ring assembly may further include a lower lamella with a second outer radial surface that defines a second outer radial width. An expander ring is in communication with the upper and lower lamellas and exerts an expander outward radial force on them to urge them towards the cylinder wall once installed. The first outer radial surface may be comprised of a contact section and a tapered section. The tapered section may be configured to generate a first radially inward force when the piston head moves in a first direction. The first radially inward force may be equal to or greater than the expander outward radial force in order to allow oil to pass by the first and second lamellas during the piston upstroke. The first outer radial surface generates a second radially inward force that is less than the expander outward radial force when the piston moves in a second direction. This allows the first and second lamellas to scrape the oil from the cylinder wall during the piston downstroke.

In some exemplary approaches, both the first and second lamellas have a contact section and a tapered section. In one exemplary approach they tapered sections are orientated in the same direction. Each tapered section may generate a radially inward force when moved in the first direction capable of overcoming the expander outward radial force. In an alternate exemplary approach, the radially inward forces of each tapered section may combine to overcome the expander outward radial force when moved in the first direction. In still another exemplary approach, the tapered sections may be orientated in opposite directions to facilitate ease of installation. In this exemplary approach, the lamellas move in concert in the first direction to allow oil to pass by the oil control assembly. On the downstroke, the lamellas operate independently to scrape the oil from the cylinder wall. As such, the lamellas may behave differently with respect to the interface between the outer contact surfaces and the cylinder bore, depending on the direction of travel.

Exemplary outer radial surfaces of the lamellas may include a first radius section, a contact section, a tapered section, and a second radius section. The contact section may comprise a flattened contact section to facilitate a sealing connection to the cylinder wall. Merely by way of example, the contact section may be less than 25% of the outer radial width in one exemplary approach. In another, the tapered section is configured to form an 8 degree angle with the cylinder wall. These exemplary approaches allow the reduction of the expander outward radial force below levels typical of previous approaches. In one exemplary approach, the expander outward radial force may be reduced to less than 27 Newtons (N).

In some exemplary processes, lamellas of an oil control ring assembly may behave differently with respect to the interface between the outer contact surfaces and the cylinder bore, depending on the direction of travel. An exemplary process may include utilizing an oil control ring assembly comprising at least one lamella positioned within an oil ring groove of a piston, the lamella comprising a first outer radial surface with a first outer radial width, the first outer radial surface including a first contact section and a first tapered section, and biasing the lamella radially outward with an expander radial force generated by an expander ring in communication with the lamella. The exemplary process may further include generating a first radially inward force in response to contacting oil when the lamella is moved in a first direction permitting oil to pass by the first contact surface, and scraping oil from the cylinder when the lamella is moved in a second direction.

In other exemplary approaches, a reduction in contact surface between a radially outer surface of an oil control ring assembly may be employed to reduce a spring tension constant of an expander, while maintaining adequate tension to control oil consumption. For example, an exemplary piston assembly may include a piston head having first and second compression ring grooves, compression rings within the grooves, an oil control ring groove, and an oil control ring assembly. The oil control ring assembly may further include an upper lamella having a first outer radial surface with a first outer radial surface width, and a lower lamella having a second outer radial surface with a second outer radial surface width. The upper and lower lamellas may define a first axial height and a second axial height, respectively. The oil control ring assembly may further include an expander ring in communication with the upper lamella and the lower lamella, which generates an expander radial outward force on the upper lamella and the lower lamella. At least one of the first axial height and the second axial height may be greater than the first outer radial surface width and the second outer radial surface width, respectively.

Some exemplary processes may utilize a reduction in contact surface between a radially outer surface of an oil control ring assembly and a cylinder bore, thereby facilitating a reduction in a spring tension constant of an expander while maintaining adequate tension to control oil consumption. An exemplary process for controlling oil within the cylinder of an internal combustion engine may include utilizing an oil control ring assembly comprising upper and lower lamellas positioned within an oil ring groove of a piston. The lamellas may each comprise an outer radial surface, with each outer radial surface having respective outer radial widths. The process may further include biasing the lamella radially outward with an expander radial force generated by an expander ring in communication with the lamella, and scraping oil from the cylinder when the lamella is moved axially with respect to a cylinder bore of the internal combustion engine. The process may further include establishing at least one of the upper and lower lamellas as having an axial height greater than the respective outer radial surface width of the at least one of the upper and lower lamellas.

Figure 2:
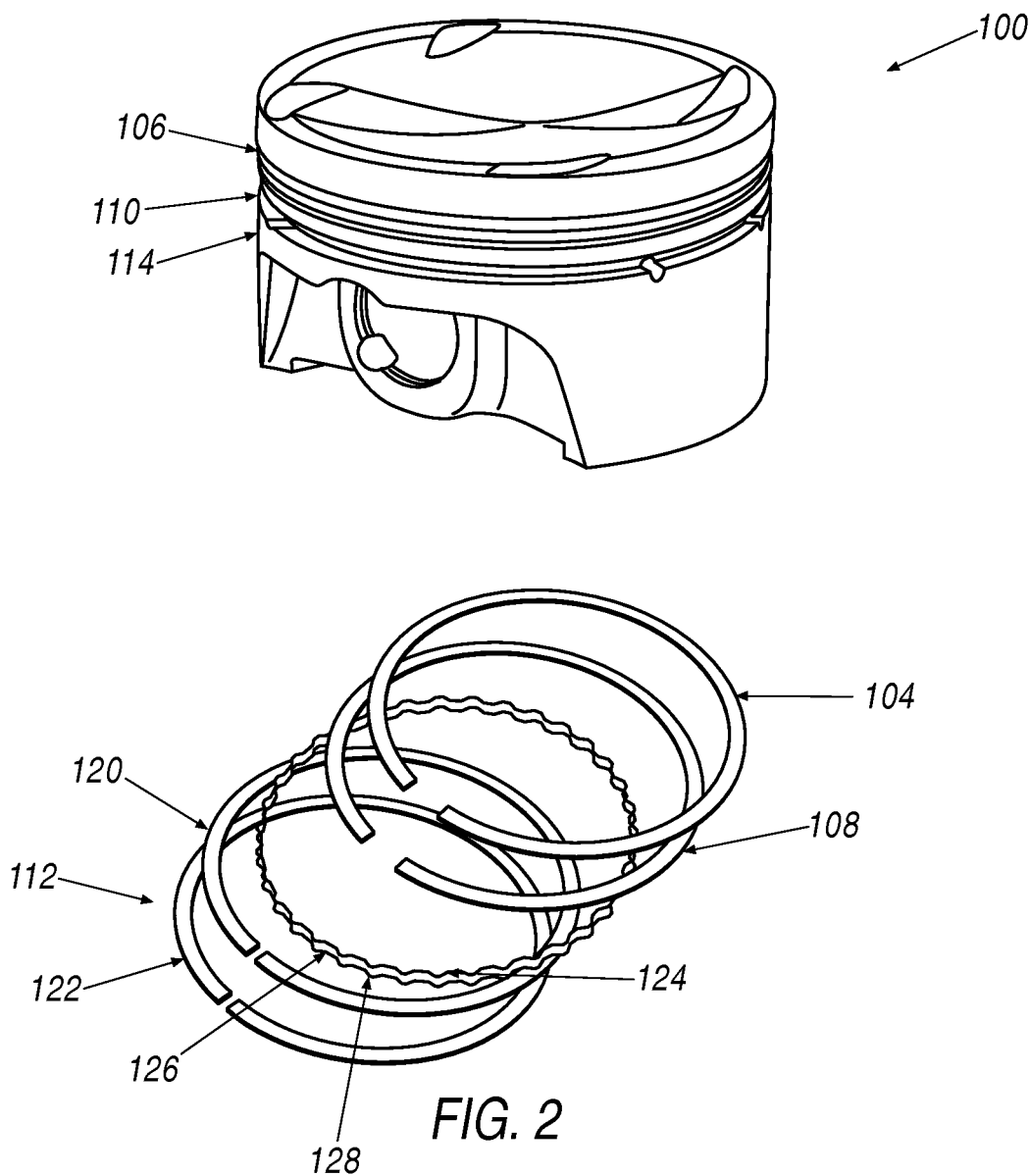
FIG. 2 is an exploded view of the exemplary piston assembly of FIG. 1.
Figure 3:
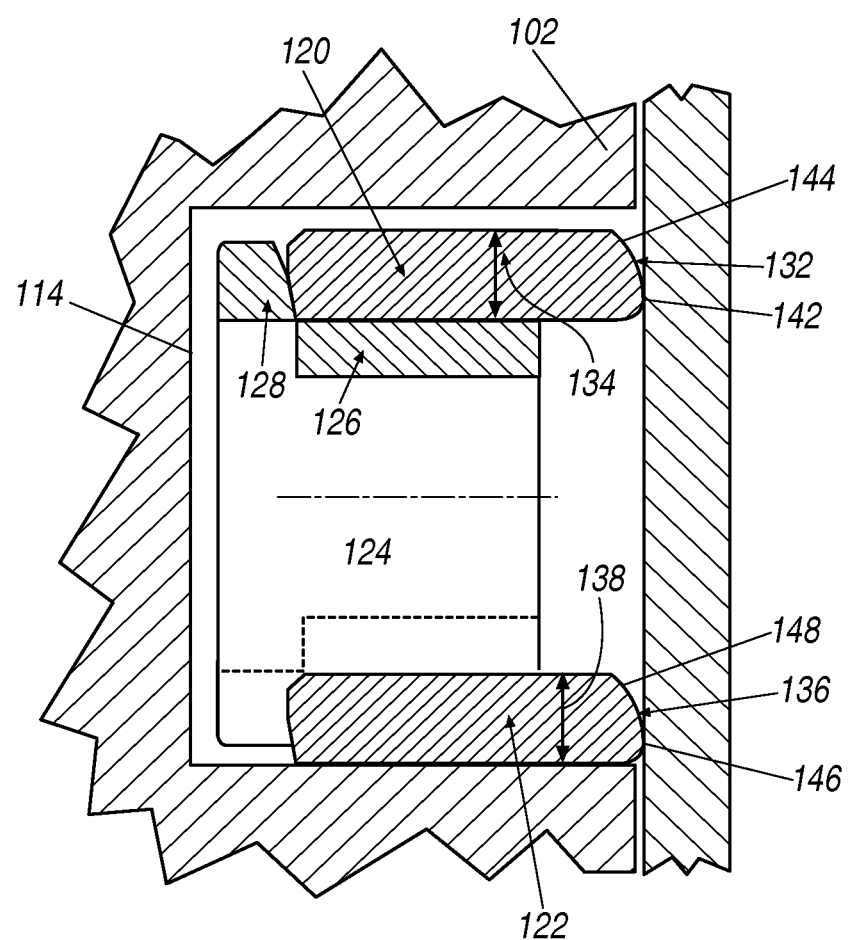
FIG. 3 is a partial section view of an exemplary oil control ring assembly.

Turning now to FIGS. 1 and 2, an exemplary piston assembly 100 is illustrated. Piston assembly 100 may include a piston head 102 including an upper compression ring 104 positioned within an upper compression ring groove 106 and a lower compression ring 108 positioned within a lower compression ring groove 110. The piston head 102 further includes an oil control ring assembly 112 positioned within an oil control ring groove 114. The compression rings 104, 108 and the oil control ring assembly 110 seal against cylinder bore surfaces during reciprocal motion of the piston assembly 100 within the cylinder bore. The piston head 102 moves in a first direction 116 during the upstroke phase of the piston assembly 100 and a second direction 118 during the downstroke phase of the piston assembly 100.

The oil control ring assembly 112 may include an upper lamella 120 and a lower lamella 122. The upper and lower lamellas 120, 122 may be positioned within the oil control ring groove 114 such that they are parallel to each other and orthogonal to the axial axis of the piston. An expander ring 124 is positioned between and in communication with the lamellas 120, 122 to bias them outward toward the cylinder wall (not shown) once installed. The expander ring 124 may be a solid member including a plurality of circumferentially spaced U-shaped segments 126. Each of these segments may include a horizontally extending tap 128. In one exemplary approach the expander ring 124 is configured to only contact the upper and lower lamellas 120, 122 once the oil control ring assembly 112 has been installed on the piston head 102.

The upper and lower lamellas 120, 122 and the expander ring 124 may be formed of a variety of materials, e.g., that may be harder than the material of the piston head 102. These materials may include, but are not limited to, steel, cast iron or sintered metallic alloys. The upper and lower lamellas 120, 122 may also be partially coated with a later of ceramic or metal material to increase the surface hardness and decrease the amount of wear imparted to the surfaces of the lamellas 120, 122. The coatings may include, but are not limited to cobalt, chromium, tungsten, copper, molybdenum and iron. Additionally, ceramic coatings are contemplated such as oxides, carbides, nitrides and silicates. The metals may be included in any stoichiometric combination with these materials. Wear resistant coatings may be applied in any of a variety of methods including, but not limited to, chemical vapor deposition, physical vapor deposition, high velocity oxygen fuel coating, plasma deposition, electrolytic plating and electro-less plating.

Turning now to FIGS. 3 through 7 exemplary cross-sectional views are provided of a portion of the piston assembly 100 installed within a cylinder wall 130. It should be understood that the features of FIGS. 3 through 7 may be exaggerated to illustrate relationships and are not drawn to scale. The expander ring 124 biases the upper lamella 120 and the lower lamella 122 into contact with the cylinder wall 130. The upper lamella 120 includes a first outer radial surface 132 having a first outer radial surface width 134. The lower lamella 122 includes a second outer radial surface 136 having a second outer radial surface width 138. The expander ring 124 generates an expander radial outward force 140 on the upper and lower lamellas 120, 122 such that the first outer radial surface 132 and the second outer radial surface 136 are pressed into contact with the cylinder wall 130. In the presented exemplary approach the first and second outer radial surfaces 132, 136 are configured such that the expander ring 124 may produce a reduced expander radial outward force 140. In one non-limiting example the expander radial outward force 140 is less than 27 Newtons. The reduced spring rate of the expander ring 124 may improve response of the lamellas 120, 122 as described further below.

In one exemplary illustration, the first outer radial surface 132 includes a first contact section 142 and a first tapered section 144. The second outer radial surface 136 includes a second contact section 146 and a second tapered section 148. In an exemplary illustration, the first and second contact section 142, 146 may be flattened contact surfaces. Flattened contact surfaces may be utilized in order to insure contact with the cylinder wall 130 around the entire circumference of the lamellas 120, 122. The flattened contact surfaces accommodate variances in manufacturing tolerances during production of the lamellas 120, 122. The first and second contact sections 142, 146 may be less than 25% of their respective outer radial surface widths 134, 138. In another exemplary approach, the first and second contact sections 142, 146 may be between 10% and 15% of their respective outer radial surface widths 134, 138. In still another, the first and second contact sections 142, 146 may be minimized to a point where manufacturing tolerances allow.

The first outer radial surface 132 may further include a first radius section 150 positioned adjacent the first contact section 142 and a second radius section 152 positioned adjacent the first tapered section 144. Similarly, the second outer radial surface 136 may include a third radius section 154 positioned adjacent the second contact section 146 and a fourth radius section 156 adjacent the second tapered section 148. In one exemplary non-limiting example, the first radius section 150 has a smaller radius than the second radius section 152 and the third radius section 154 has a smaller radius than the fourth radius section 156. In another, non-limiting exemplary approach the first and third radius sections 150, 154 have a radius of approximately 80 microns and the second and fourth radius sections 152, 156 have a radius of approximately 160 microns.

Figure 4:
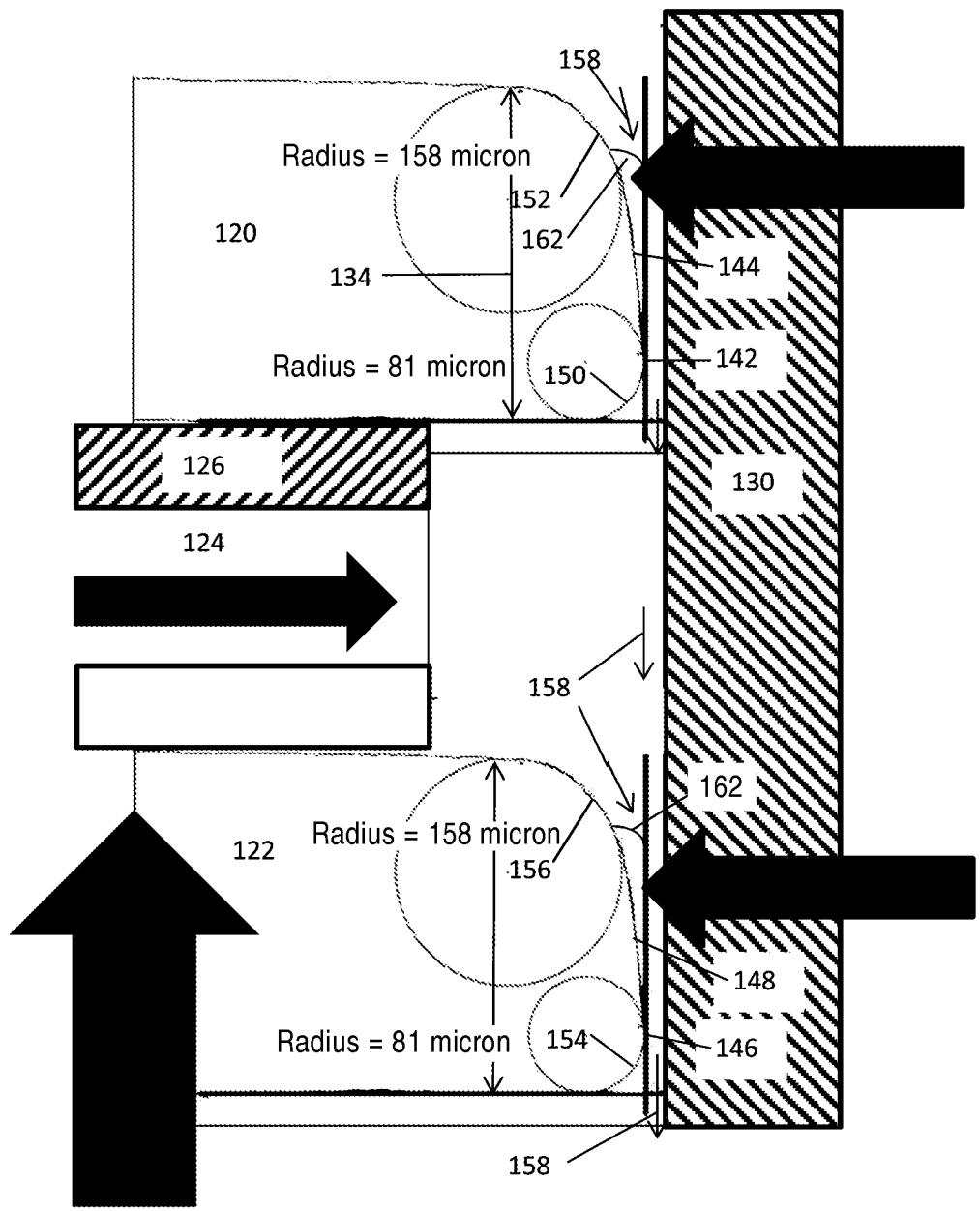
FIG. 4 is a partial section view of the exemplary oil control ring assembly shown in FIG. 3, the oil ring assembly illustrated during a piston upstroke.
Figure 5:
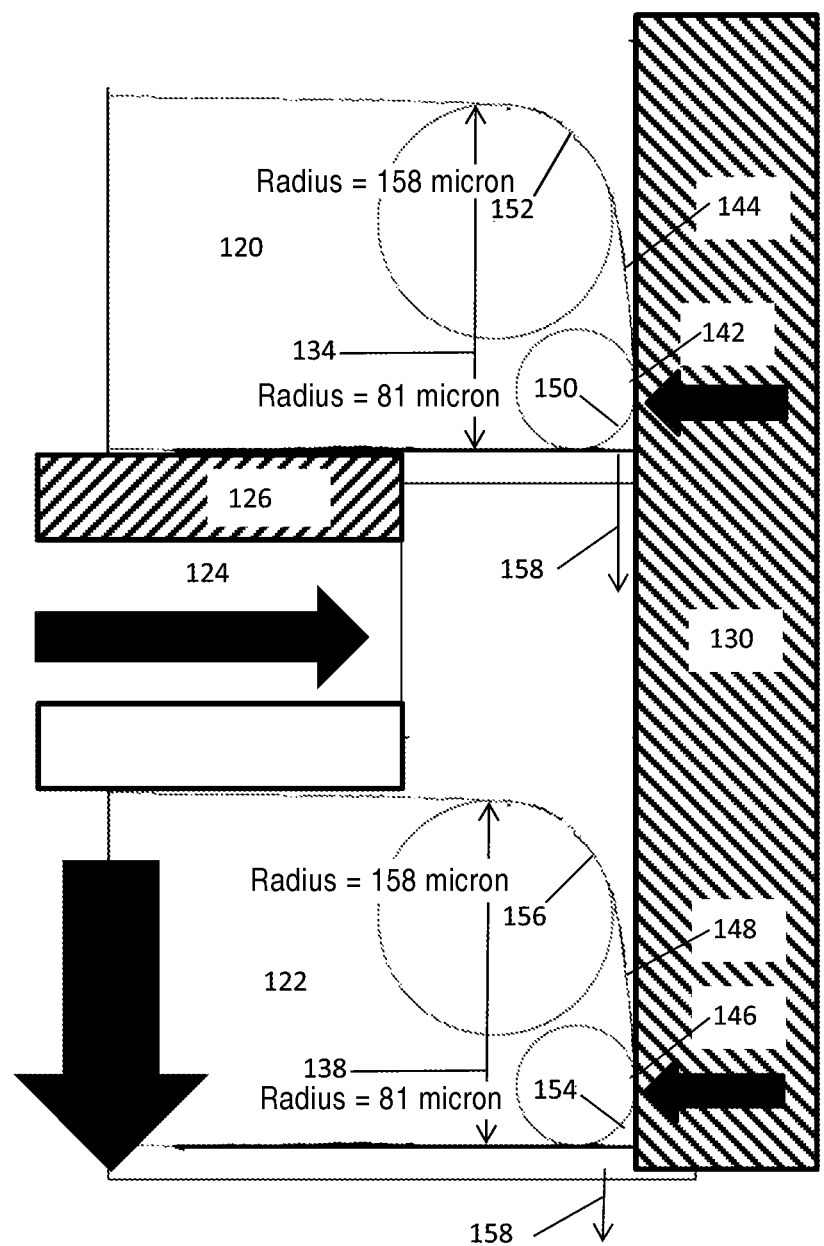
FIG. 5 is a partial section view of the exemplary oil control ring assembly shown in FIG. 4, the oil ring assembly illustrated during a piston downstroke.

Turning now to FIGS. 4 and 5, an exemplary oil control ring assembly 112 has been configured to optimize oil 158 flow past the first and second lamellas 120, 122 when the piston assembly 100 moves in the first direction 116 (upstroke—FIG. 4) and optimize the scraping of oil 158 when the piston assembly moves in the second direction 118 (downstroke—FIG. 5). In one exemplary approach, oil flow in the first direction 116 is optimized by configuring the first tapered section 144 such that it generates a first radially inward force 160 when contacting oil 158 as the piston assembly moves in the first direction 116. The first radially inward force 160 may be equal to or greater than the expander radial outward force 140 such that the first lamella 120 moves inward to allow oil 158 to flow past its outer radial surface 132. The first tapered section 144 is at an angle 162 relative to the cylinder wall 130. In one exemplary illustration, the angle 162 is less than 10 degrees. In another example, the angle 162 is approximately 8 degrees. The angle 162 of the first tapered section 144 in combination with reduced first contact section 142 area may allow the generation of a sufficient radially inward force 160 to overcome the expander radial outward force 140. The oil 158 accumulates in the area between the first tapered section 144 and the cylinder wall 130. As the piston assembly moves in the first direction 116, the oil 158 accumulates and generates a force on the upper lamella 120. The profile of the first tapered section 144 turns this force into the first radially inward force 160 which urges the upper lamella 120 inwardly.

The second tapered section 148 of the second lamella 122 may also be configured such that it generates a third radial inward force 164 when contacting oil 158 as the piston assembly moves in the first direction 116. The third radially inward force 164 may be equal to or greater than the expander radial outward force 140 such that the second lamella 122 moves inward to allow oil 158 to flow past its outer radial surface 136. The second tapered section 148 is at an angle 162 relative to the cylinder wall 130. On one exemplary approach, the angle 162 is less than 10 degrees. On another exemplary approach, the angle 162 is approximately 8 degrees. The angle 162 of the second tapered section 148 in combination with reduced second contact section 146 area may allow the generation of a sufficient radially inward force 164 to overcome the expander radial outward force 140. In one exemplary approach, each of the first radially inward force 160 and the third radially inward force 164 are each independently capable of overcoming the expander radial outward force 140. In another non-limiting example, the first radially inward force 160 and the third radially inward force 164 combine to overcome the expander radial outward force 140.

As shown in FIG. 5, the first outer radial surface 132 and the first tapered section 144 may be optimized such that when the piston moves in the second direction 188 the first lamella 120 acts to scrape oil 158 from the cylinder wall 130. The oil flow in the second direction 116 is minimized by configuring the first tapered section 144 such that it generates a second radially inward force 166 when contacting oil 158 as the piston assembly moves in the second direction 118. The second radially inward force 166 may be minimal and may be less than the expander radial outward force 140. The expander radial outward force 140 will maintain contact between the first contact surface 142 and the cylinder wall 130 such that the oil 158 is scraped downward toward the oil reservoir (not shown). The second outer radial surface 136 and the second tapered section 148 may also be optimized such that when the piston moves in the second direction 188 the second lamella 122 acts to scrape oil 158 from the cylinder wall 130. The oil flow in the second direction 116 is minimized by configuring the second tapered section 148 such that it generates a fourth radially inward force 168 when contacting oil 158 as the piston assembly moves in the second direction 118. The fourth radially inward force 168 is similarly minimized such that the second contact surface 146 remains in contact with the cylinder wall 130 such that the oil 158 is scraped downward toward the oil reservoir (not shown).

Figure 6:
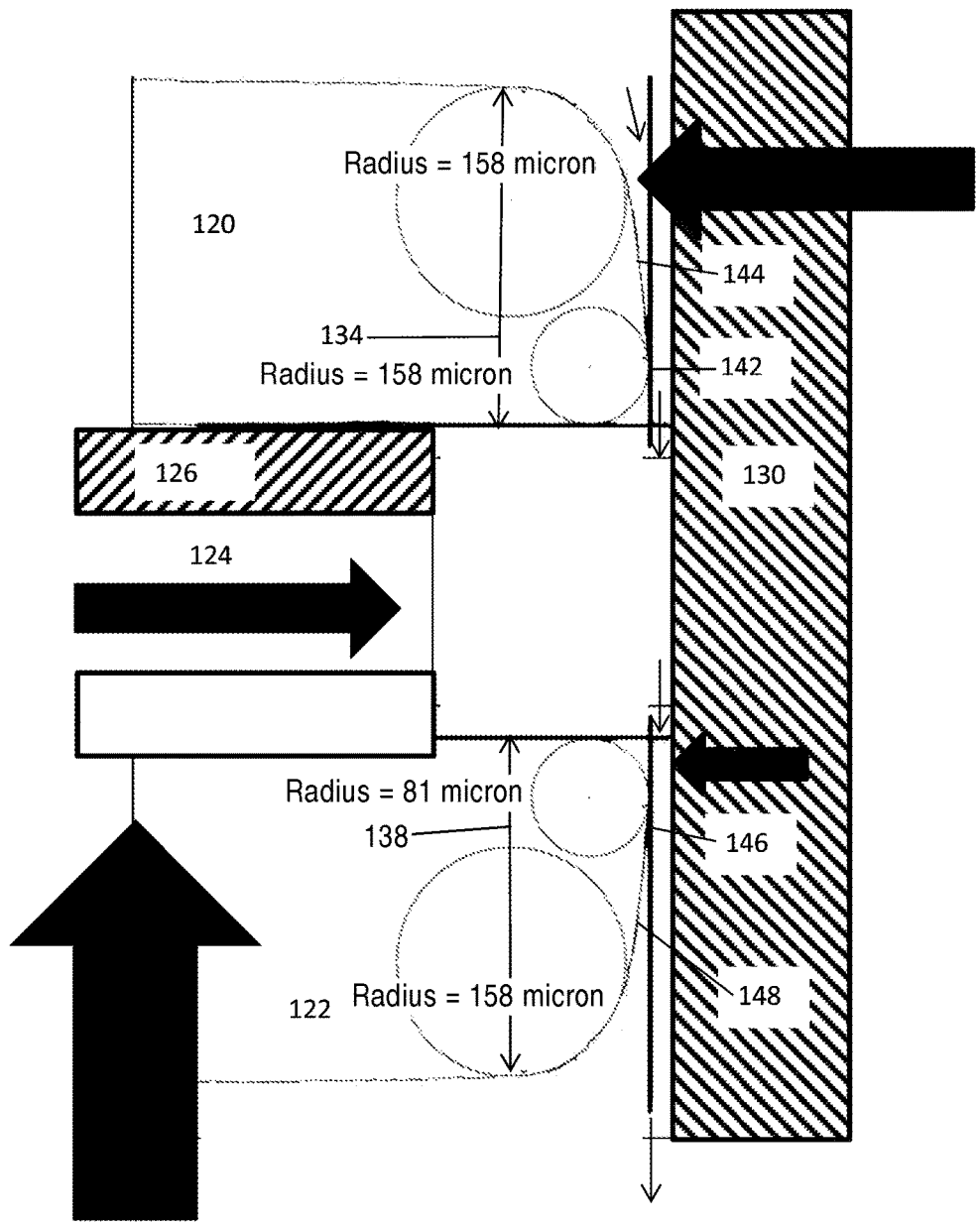
FIG. 6 is a partial section view of another exemplary oil control ring assembly, the oil ring assembly illustrated during a piston upstroke.
Figure 7:
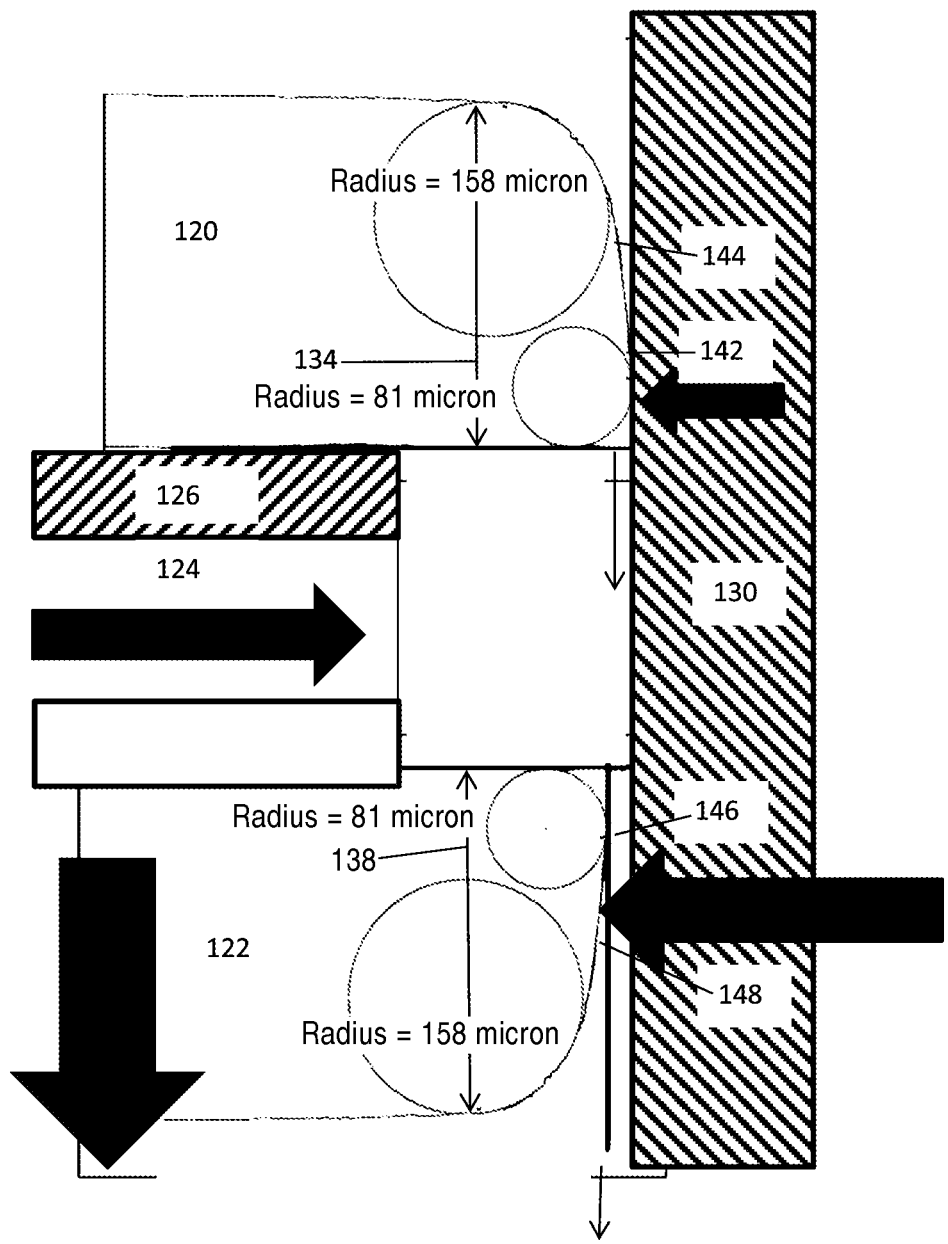
FIG. 7 is a partial section view of the exemplary oil control ring assembly shown in FIG. 6, the oil ring assembly illustrated during a piston downstroke.

Turning now to FIGS. 6 and 7, an alternate non-limiting example of an oil ring assembly 112 is presented. In the previous exemplary approach, the first tapered section 144 and the second tapered section 148 are orientated in the same direction such that they operate in a similar fashion to one another. However, this requires proper orientation during installation. The exemplary approach illustrated in FIGS. 6 and 7 contemplates the first tapered section 144 and the second tapered section 148 orientated in opposite directions such that there are no need to verify orientation during installation. In this example, the first lamella 120 and the second lamella 122 are configured to move in concert when the piston is moving in the first direction 116 (FIG. 6). This allows the first radial inward force 160 generated by the first tapered section 144 to overcome the expander radially outward force 140 and move the first and second lamellas 120, 122 to move inward and allow oil 158 to pass by them. The first lamella 120 and the second lamella 122 are configured to move independently when the piston moves in the second direction 118 (FIG. 7). The second radially inward force 166 generated by the first tapered section 144 remains less than the expander radially outward force 140 and therefore the first contact surface 142 remains in contact with the cylinder wall 130 to scrap oil 158 from its surface. Even if the second tapered surface 148 moves the second contact surface 146 away from the cylinder wall 130, the first contact surface 142 will remain in contact to scrape oil on the downstroke 118.

Figure 8:
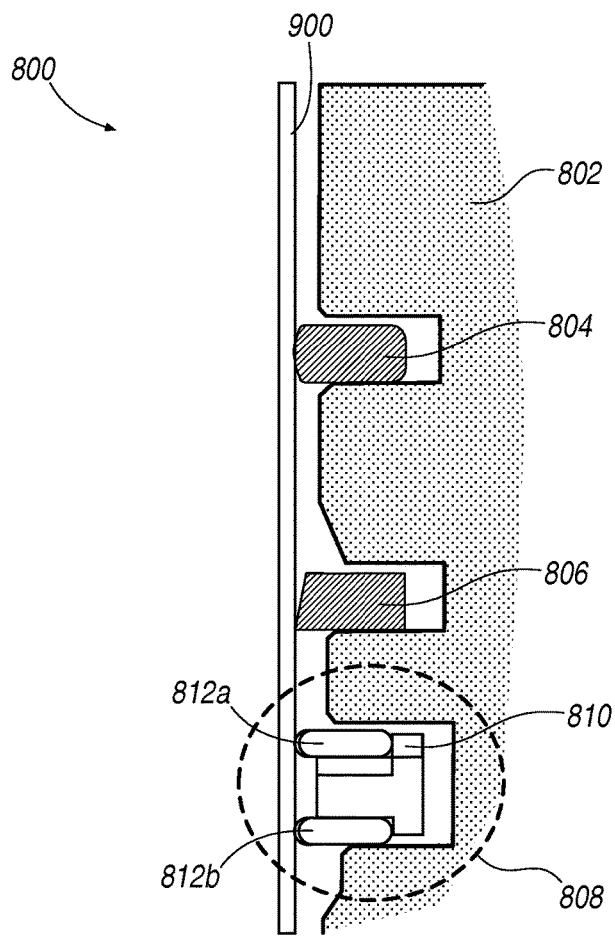
FIG. 8 is a section view of another exemplary piston assembly.
Figure 9:
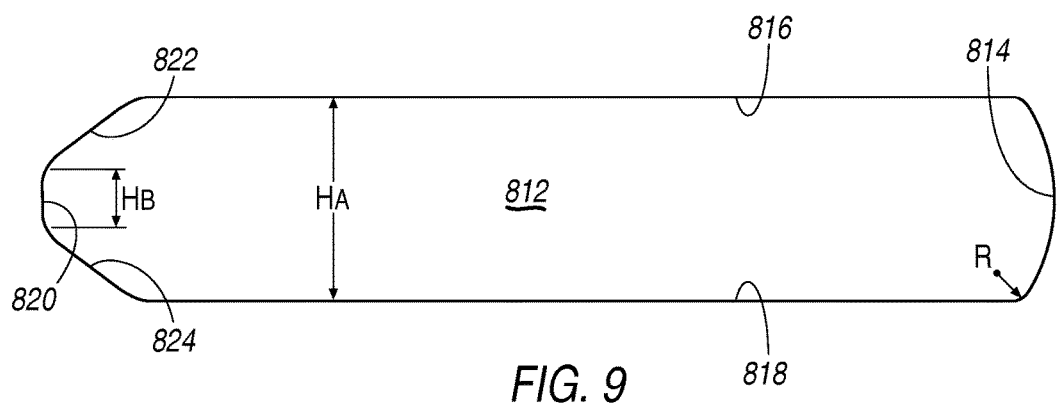
FIG. 9 is a section view of an exemplary piston ring or lamella, e.g., as used in connection with the exemplary piston assembly shown in FIG. 8.

Turning now to FIGS. 8 and 9, another exemplary piston assembly and oil control rail assembly are described. Piston assembly 800 may generally include a piston body 802 and two upper piston rings 804, 806 disposed in respective ring grooves thereof. The piston body 802 may include a further ring groove receiving an oil control rail assembly 808. Oil control rail assembly 808 may include an expander 810 in communication with an upper lamella or rail 812a, and a lower lamella/rail 812b. As seen in FIG. 9, each lamella 812 includes an upper surface 816, and a lower surface 818. A radially inner surface 814 extends therebetween on a radially inner portion of the lamellas 812, and is configured to contact the expander 810 (see FIG. 8) when the expander 810 urges the lamellas 812 radially outwardly and into contact with the cylinder bore surface 900. A radially outer portion of the lamellas 812 include a radially outer surface 820 which extends axially between the upper and lower surfaces 816, 818. Additionally, the lamellas 812 may define angled surfaces 822, 824 extending from the upper and lower surfaces 816, 818 to the radially outer surface 820, respectively. The angled surfaces 822, 824 may extend linearly from the upper and lower surfaces 816, 818 to the radially outer surface 820, respectively. The radially outer surface 820 may define a generally planar interface with the cylinder bore 900 extending between the angled surfaces 822, 824. As such, a substantially planar radially outer surface 820 may cooperate with the angled surfaces 822, 824 to form a conical or "bullet nose" profile along the radially outer end of the lamella(s) 812.

As best seen in FIG. 9, in this exemplary illustration one or both of the upper and lower lamellas 812 may have a narrowed profile or bullet shape adjacent a radially outer area where the lamellas 812 contact a cylinder bore surface 900 (see FIG. 8). The lamellas 812 may be pointed or conical in shape such that a middle portion touches cylinder bore surface. More specifically, a radially outer surface 820 defined by the lamella 812 has significantly less surface area contacting the cylinder wall.

Accordingly, a reduced tension of the expander 810 may be employed, since contact pressure is a function of the surface area of the lamella 812 contacting the cylinder bore 900. Moreover, the reduce contact area of the lamella 812 on the cylinder wall means that unit pressure can be varied more significantly for a given change in the expander spring tension constant. Additionally, the reduced surface area of the lamella 812 described in this exemplary approach provides greater force per unit area compared with conventional oil control ring assemblies, while using less spring tension. The narrow outer face 820 of the lamella 812 thus generally reduces the amount of radial outer force/tension needed from the expander 810 to maintain nominal contact pressure and also consistent oil film thickness on the cylinder bore surface 900.

The axial size of the radially outer surface 820 relative to the lamella 812 may be any that is convenient. Merely as one example, in one exemplary approach an axial height $H_A$ of the lamella 812 is approximately 0.4 millimeters (mm), while the axial height of the radially outer surface 820 is approximately 0.09 mm. Exemplary approaches may therefore utilize radially outer surfaces having approximately 25% of the axial height of the main portion or body of the lamella 812. Exemplary radially outer surfaces 820 may be generally planar (i.e., extending axially with respect to the piston/cylinder bore) such that the radially outer surface 820 is parallel to the cylinder bore 900.

As noted above, the reduction in surface area contacting the cylinder bore surface 900 results in a corresponding reduction in force needed from the expander 810. In one exemplary approach, expander force was reduced from 25.8 Newtons (N) to 15 N. In another example, expander force was reduced over 50%, from 25 N to 12 N. Moreover, simulations of exemplary illustrations demonstrated potential or a further reduction in expander force to 8 N.

Piston rings, e.g., lamellas 812, may typically not be stationary inside the piston ring groove during operation. Exemplary piston rings typically may have a measured clearance between itself and the piston ring groove walls. The ring moves within the groove in several directions during normal engine operation. This continuous moment against the piston body causes the ring and groove to degrade in a fairly predicable wear pattern. Exemplary approaches described herein may generally reduce the amount of wear induced by the modified shape of the ring. For example, portions of the lamellas/rings that contact the piston groove and/or cylinder bore can be shaped in a way that reduces ring wear during the service life of the engine.

The reduced contact area between the radially outer surface 820 had previously been thought to result in unacceptable wear. However, exemplary oil control rail assemblies have surprisingly performed with adequate wear characteristics, although somewhat elevated with respect to rings having larger contact areas. Merely as one exemplary illustration, wear of the outer face, i.e., of the radially outer surface 820, increased from 0.00075 mm to 0.00395 mm during one baseline wear test examining radial wear of the ring/lamella 812. Despite the approximately fivefold increase in radial wear, loss of tension due to this radial wear was modest and acceptable. In some exemplary approaches, the pointed or conical shape of the radially outer portion of the lamella(s) 812 results in a generally increasing resistance to wear as the radial wear occurs. More specifically, as radial wear occurs to the radially outer surface 820, axial height thereof increases as more of the "cone" or "point" wears away.

In some examples, lapping of the radially outer surface 820 improved performance by avoiding damage to the outer face profile. More specifically, lapping may generally increase the degree to which the radially outer surface 820 is planar upon initial break-in of the oil control assembly 808.

In some exemplary approaches, the profile of the lamella(s) 812 may be symmetrical axially. For example, as best seen in FIG. 9, the upper and lower angled surfaces 822, 824 are approximately the same length, and the radially outer surface 820 is positioned approximately in the middle axially with respect to the lamella 812.

As also best seen in FIG. 9, the radially inner surface 814 may have a generally increased diameter R as compared with previous approaches. The increased radius R may generally increase contact area between the expander 810 and the radially inner face 814, thereby reducing contact pressure and thus secondary wear of the radially inner portion of the lamella 812. Merely as one example, the corner radius was increased from approximately 0.2 mm to 0.4 mm.

Piston rings or lamellas described herein may be coated along radially outer surfaces, e.g., radially outer surface 820, and angled surfaces 822, 824. The lamellas/rings may be formed of a base steel material, e.g., stainless steel, and then nitride. Nitrided radially outer ring surfaces may demonstrates significantly less wear than rings not treated with a nitride coating.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. An oil control ring assembly for a piston of an internal combustion engine, comprising:
   an upper lamella having a first outer radial surface with a first outer radial surface width;
   a lower lamella having a second outer radial surface with a second outer radial surface width; and
   an expander ring in communication with the upper lamella and the lower lamella, the expander ring generating an expander radial outward force on the upper lamella and the lower lamella;
   wherein:
   at least one of the first outer radial surface and the second outer radial surface includes a cross-sectional profile comprised of a first contact section for contacting a cylinder wall, and a first tapered section tapering away from the first contact section and for being spaced apart from the cylinder wall;
   the first contact section is a flattened contact surface;
   the cross-sectional profile includes a first rounded section located between and adjoining a bottommost surface of the upper or lower lamella and the first contact section, the first rounded section includes a first radius of curvature, and the first rounded section extending from the bottommost surface of the upper or the lower lamella to the first contact section, and the bottommost surface being flat, wherein the first tapered section is non-orthogonal with respect to the bottommost surface;
   the cross-sectional profile includes a second rounded section located between and adjoining a topmost surface of the upper or lower lamella and the first tapered section, the second section includes a second radius of curvature, the second radius of curvature having a different magnitude than the first radius of curvature, and the second rounded section extending from the top surface of the upper or the lower lamella to the first tapered section; and
   the first tapered section and the first contact section are positioned axially between the first rounded section and the second rounded section.

2. The oil control ring assembly according to claim 1, wherein the first tapered section is configured to have an angle of less than 10 degrees from vertical.

3. The oil control ring assembly according to claim 1, wherein:
   the first outer radial surface comprises the first contact section and the first tapered section.

4. The oil control ring assembly according to claim 1, wherein the first contact section comprises less than 25% of the first outer radial surface width.

5. The oil control ring assembly according to claim 1, wherein the first contact section comprises between 10% and 15% of the first outer radial surface width.

6. The oil control ring assembly in accordance to claim 1, wherein the second radius of curvature has a larger radius than the first radius of curvature.

7. An oil control ring assembly for a piston of an internal combustion engine, comprising:
   an upper lamella having a first outer radial surface with a first outer radial surface width, the upper lamella defining a first axial height;
   a lower lamella having a second outer radial surface with a second outer radial surface width, the lower lamella defining a second axial height; and
   an expander ring in communication with the upper lamella and the lower lamella, the expander ring generating an expander radial outward force on the upper lamella and the lower lamella;
   wherein:
   at least one of the first axial height and the second axial height is greater than the first outer radial surface width and the second outer radial surface width, respectively;
   at least one of the first outer radial surface and the second outer radial surface includes a cross-sectional profile comprised of a first contact section for contacting a cylinder wall, and a first tapered section tapering away from the first contact section and for being spaced apart from the cylinder wall;
   the first contact section is a flattened contact surface;

the cross-sectional profile includes a first rounded section located between and adjoining a bottommost surface of the upper or the lower lamella and the first contact section, the first rounded section includes a radius of curvature, and the first rounded section extending from the bottommost surface of the upper or the lower lamella to the first contact section, and the bottommost surface being flat, wherein the first tapered section is non-orthogonal with respect to the bottommost surface;

the cross-sectional profile includes a second rounded section located between and adjoining a topmost surface of the upper or the lower lamella and the first tapered section, the second section includes a second radius of curvature, the second radius of curvature having a different magnitude than the first radius of curvature, and the second rounded section extending from the top surface of the upper or the lower lamella to the first tapered section; and the first tapered section and the first contact section are positioned axially between the first rounded section and the second rounded section.

8. The oil control ring assembly according to claim 7, wherein the first axial height is greater than the first outer radial surface width; and wherein the second axial height is greater than the second outer radial surface width.

9. The oil control ring assembly according to claim 7, wherein the first and second outer radial surface widths are approximately equal.

10. The oil control ring assembly according to claim 7, wherein at least one of the upper and lower lamellas tapers axially from the first radius section to the second radius section, respectively.

11. The oil control ring assembly according to claim 7, wherein at least one of the first outer radial surface width and the second outer radial surface width is no greater than 25% of first axial height and second axial height, respectively.

12. The oil control ring assembly according to claim 7, wherein a radially inner surface of at least one of the upper and lower lamellas defines a radius of curvature between upper and lower surfaces of the at least one of the upper and lower lamellas.

13. The oil control ring assembly according to claim 7, wherein the magnitude of the second radius of curvature is greater than the first radius of curvature.

14. An oil control ring assembly for a piston of an internal combustion engine, comprising:

an upper lamella having a first outer radial surface with a first outer radial surface width and having a first axial height;

a lower lamella having a second outer radial surface with a second outer radial surface width and having a second axial height; and an expander ring in communication with the upper lamella and the lower lamella;

wherein:

at least one of the first outer radial surface and the second outer radial surface includes a cross-sectional profile comprised of a first contact section for contacting a cylinder wall and a first tapered section tapering away from the first contact section and for being spaced apart from the cylinder wall;

the first contact section is a flattened contact surface the cross-sectional profile includes a first rounded section located between and adjoining a bottommost surface of the upper or lower lamella and the first contact section, the first rounded section includes a first radius of curvature, and the first rounded section extending from the bottommost surface of the upper or the lower lamella to the first contact section, and the bottommost surface being flat, wherein the first tapered section is non-orthogonal with respect to the bottommost surface;

the cross-sectional profile includes a second rounded section located between and adjoining a topmost surface of the upper or lower lamella and the first tapered section the second section includes a second radius of curvature, the second radius of curvature having a different magnitude than the first radius of curvature, and the second rounded section extending from the top surface of the upper or the lower lamella to the first tapered section; and the first tapered section and the first contact section are positioned axially between the first rounded section and the second rounded section.

15. The oil control ring assembly according to claim 14, wherein at least one of the first axial height and the second axial height is greater than the first outer radial surface width and the second outer radial surface width, respectively.

16. The oil control ring assembly according to claim 15, wherein the first axial height is greater than the first outer radial surface width, and the second axial height is greater than the second outer radial surface width.

17. The oil control ring assembly according to claim 15, wherein at least one of the upper and lower lamellas tapers axially from the first radius section to the second radius section, respectively.

18. The oil control ring assembly according to claim 15, wherein at least one of the first outer radial surface width and the second outer radial surface width is no greater than 25% of first axial height and second axial height, respectively.

19. The oil control ring assembly according to claim 15, wherein a radially inner surface of at least one of the upper and lower lamellas defines a radius of curvature between upper and lower surfaces of the at least one of the upper and lower lamellas.

20. The oil control ring assembly according to claim 15, wherein the magnitude of the second radius of curvature is greater than the first radius of curvature.

* * * * *